(12) United States Patent
Bertelsman

(10) Patent No.: US 10,710,322 B1
(45) Date of Patent: Jul. 14, 2020

(54) MATTE FILM AND METHOD OF MANUFACTURE THEREFORE

(71) Applicant: Accredo Packaging, Inc., Sugar Land, TX (US)

(72) Inventor: David Gara Bertelsman, Jackson, TX (US)

(73) Assignee: Accredo Packaging, Inc, Sugar Land, TX (US)

( * ) Notice: Subject to any disclaimer, the term of this patent is extended or adjusted under 35 U.S.C. 154(b) by 564 days.

(21) Appl. No.: 15/180,007

(22) Filed: Jun. 11, 2016

Related U.S. Application Data

(60) Provisional application No. 62/174,718, filed on Jun. 12, 2015.

(51) Int. Cl.
| | |
|---|---|
| *B29C 70/62* | (2006.01) |
| *B29C 71/00* | (2006.01) |
| *B29B 7/90* | (2006.01) |
| *B29C 48/08* | (2019.01) |
| *B29C 48/00* | (2019.01) |
| *B29C 37/00* | (2006.01) |
| *B29C 70/64* | (2006.01) |
| *B29D 7/01* | (2006.01) |
| *B29K 105/18* | (2006.01) |
| *B29K 509/00* | (2006.01) |
| *B29L 7/00* | (2006.01) |

(52) U.S. Cl.
CPC ............... *B29C 70/62* (2013.01); *B29B 7/90* (2013.01); *B29C 37/0053* (2013.01); *B29C 48/0012* (2019.02); *B29C 48/0018* (2019.02); *B29C 48/022* (2019.02); *B29C 48/08* (2019.02); *B29C 70/64* (2013.01); *B29C 71/0072* (2013.01); *B29K 2023/06* (2013.01); *B29K 2105/18* (2013.01); *B29K 2509/00* (2013.01); *B29K 2995/0024* (2013.01); *B29L 2007/008* (2013.01)

(58) Field of Classification Search
CPC ..................... B29C 47/0042; B29C 47/0057
USPC ........................................................ 264/108
See application file for complete search history.

(56) References Cited

U.S. PATENT DOCUMENTS

| | | | |
|---|---|---|---|
| 3,154,461 A | 10/1964 | Johnson | |
| 3,315,020 A * | 4/1967 | Gore | B29C 47/0004 264/120 |
| 4,056,591 A * | 11/1977 | Goettler | B29C 47/0004 138/174 |
| 4,367,147 A | 3/1983 | Byrne et al. | |
| 4,546,029 A | 10/1985 | Cancio et al. | |
| 5,132,549 A * | 7/1992 | Allan | B29C 47/0004 264/108 |
| 5,281,380 A * | 1/1994 | Umeda | B29C 47/0004 264/108 |
| 5,506,046 A * | 4/1996 | Andersen | C08L 1/28 229/164.1 |
| 5,518,676 A * | 5/1996 | de Rocheprise | B29C 47/0004 264/127 |
| 5,702,546 A * | 12/1997 | Itoh | B29C 47/0019 152/209.4 |
| 5,981,047 A | 11/1999 | Wilkie | |
| 6,174,473 B1 * | 1/2001 | Levy | B29C 47/0004 264/127 |
| 6,899,782 B1 * | 5/2005 | Chang | B29C 47/0004 152/209.4 |

FOREIGN PATENT DOCUMENTS

| | | | | |
|---|---|---|---|---|
| CN | 101352927 A | * | 1/2009 | |
| WO | WO-9530713 A1 | * | 11/1995 | ............... C08J 5/18 |
| WO | WO 01/42011 A1 | | 6/2001 | |

OTHER PUBLICATIONS

Grief, Allan, Extrusion Basics: Making It Shiny, Plastics Today, Nov. 13, 2016, retreived Mar. 3, 2019, retreived from the internet: www.plasticstoday.com/extrusion-pipe-profile/.
American Society for Testing Materials, Glossary of Terms Relating to Rubber . . . , 1956, p. 96, Baltimore, USA.
NHTSA, Crosslink Density and Type Distribution in the Rubber . . . , Feb. 2010.
Wang, Kejian, Die Swell of Complex Polymeric Systems, Visioelasticity—From Theory to Biological Applications, Nov. 7, 2012, Chapter 4 pp. 77-96, IntechOpen, London, UK.

* cited by examiner

*Primary Examiner* — Atul P. Khare
(74) *Attorney, Agent, or Firm* — Joseph T Regard, Ltd plc

(57) ABSTRACT

A film structure having a matte film surface and method of manufacture thereof. The preferred embodiment of the present invention contemplates a blend of polyethylene homopolymer or copolymer resins, coupled with one or more platelet shaped (non-spherical) inorganic or organic fillers. The matte polyethylene film surface as prepared from these polymer/filler blends exhibits a low gloss matte surface for wide utility in laminated and non-laminated, food and non-food, packaging and non-packaging applications. A unique and heretofore uncontemplated technique of manufacture exploiting the phenomenon of "die swell" as enumerated herein is utilized during production to facilitate the reorientation of the fillers during the extrusion process to produce the matte surface effect.

15 Claims, 1 Drawing Sheet

MATTE FILM AND METHOD OF MANUFACTURE THEREFORE

BENEFIT CLAIM

The present application claims the benefit of U.S. Provisional Patent Application Ser. No. 62/174,718 filed Jun. 12, 2015, entitled "Matte Polyethylene Film and Method of Processing".

FIELD OF THE INVENTION

The present invention relates to a matte film surface and method of manufacture thereof, the preferred embodiment comprising a blend of polyethylene homopolymer or copolymer resins, coupled with one or more platelet shaped (non-spherical) inorganic or organic fillers. The matte polyethylene film surface prepared from these polymer/filler blends exhibit a low gloss matte surface for wide utility in laminated and non-laminated, food and non-food, packaging and non-packaging applications. A unique and heretofore uncontemplated technique of manufacture as enumerated herein is utilized during production to facilitate the orientation of the components to produce the matte surface effect.

GENERAL SUMMARY DISCUSSION OF THE INVENTION

Low gloss matte characteristics can be obtained on various polymer type surfaces by polymer material combinations, polymer/filler combinations, and/or mechanical embossing the film surface. Until now a matte polyethylene surface has been created via the simple combination of materials with no purpose except to fill the polymer system with enough filler to sufficiently create a low gloss effect.

The present invention relates to a matte polyethylene film surface prepared from polymeric/filler materials used in a blend, the interaction of materials in the manufacturing process, and manufacturing process that result in one or more film surfaces having a low gloss matte appearance and soft feel.

The matte polyethylene film surface can be part of a single layer or multilayer film. The non-surface layers of the produced film can include any or all of the following material types: polyethylene, polypropylene, nylon, EVOH, and tie materials.

The interaction or mechanical assistance of the homopolymer and/or copolymer material's molecular weight with the platelet type filler materials in the manufacturing process provides the orientation of the platelet fillers in the thickness direction, which result in a film having the characteristics of a low gloss matte film surface.

The term "die swell" as used in the present document refers to the thickness of extruded material at the exit point of an extrusion die. Material thickness that is greater than the die gap thickness of the die is "die swell". Materials with greater molecular weights exhibit greater die swell.

An indirect measurement of polymer average Molecular Weight (MW) is Melt Index (MI). MI is a measurement of the amount of polymer in grams pushed through a fixed size orifice, with a given weight, at a given temperature, during a given amount of time. See ASTM 1238. Generally as MW increases the MI decreases.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Figure 1A:
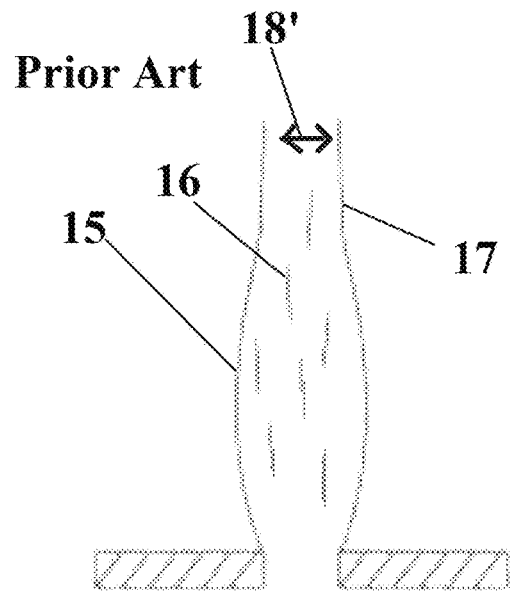
FIG. 1A is a side, partially cut-away view of an exemplary blown extrusion of thermoplastic film having platelets therein, illustrating a minor platelet reorientation at the point of extrusion where no or nominal die swell is present.

The principle of the present invention is to provide a polyethylene based matte surface of a monolayer or multilayer film through the combination of homopolymer and/or copolymer polyethylene resins of specific molecular weight range, an organic and/or inorganic platelet shaped filler materials, the unique interaction of the polymer chains with the platelet shaped filler, and the manufacturing process. A filler might comprise, for example, the mineral mica, or calcium carbonate, talc, (or a combination thereof) as well as a variety of other fillers known to be used with thermoplastics or the like.

The resulting matte surface will have low gloss and soft texture suitable for use in laminated or non-laminated, food or non-food, packaging or non-packaging applications.

The matte surface layer is comprised of the following materials:

Component (A) 0 to 85% by weight of a copolymer polyethylene having a high molecular weight characterized by Melt Index ($I_2$) of less than 0.99 g/10 min (ASTM method D1238) and a density of 0.900 to 0.965 g/cc (ASTM method D1505);

Component (B) 0 to 85% by weight of a homopolymer polyethylene having a high molecular weight characterized by Melt Index ($I_2$) of less than 0.99 g/10 min (ASTM method D1238) and a density of 0.900 to 0.965 g/cc (ASTM method D1505);

Component (C) 15 to 75% by weight of one or more inorganic and/or organic platelet shaped filler material.

Interior layers of a multilayer film where the surface layer is made from the above materials can be comprised of polyethylene, polypropylene, nylon, EVOH and/or tie layers.

Continuing with the Figures, materials (components A and/or B, and C) in the matte surface layer are combined during the extrusion manufacturing process. During the extrusion process the polymer materials are melted and polymer and platelet materials thoroughly mixed. This extrudate or molten blend of materials 3 passes thru 1 a die 2 which then forms the film 4. Prior to exiting the die, the polymer components (components A, B) molecules are oriented in the flow direction 5 of the material.

At the exit 6 of the die orifice or die gap 7, the polymer's molecules relax and the extruded material will swell 8, 8' to a thickness or diameter 9' greater than that (the diameter 7') of the die exit orifice 7. This characteristic is called "die swell" 9. Polymers with greater molecular weight or lower melt index will have greater die swell.

The unique interaction between the relaxation of the polymer chains during die swell and the platelet shaped filler material or platelets 10 as it exits the die exit orifice or die gap results in a mechanical assist 11, 11' which facilitates or results in rotating or reorienting 12 the platelet material or platelets 10, 10', 10" in the Z axis or thickness direction 18 of the film. The mechanical assist 11, 11' of the platelets 10, 10', 10" creates greater surface roughness 13 and lower gloss matte PE surface as compared to simple blends of polymer and filler.

While die swell is often a condition which is to be minimized or avoided in film extrusion, in the present invention the phenomenon of die swell can be exploited by utilizing same to re-orient the platelet material, and as such the extrusion parameters can be adjusted to vary the die swell as required, even (when desired) enhancing same, to optimize the reorientation of the platelets and resulting matte finish.

Referring to FIG. 1A, material is shown exiting the die exit orifice with low die swell 15 and resulting minor platelet 16 orientation in the thickness direction 18' of the film 17.

Figure 1B:
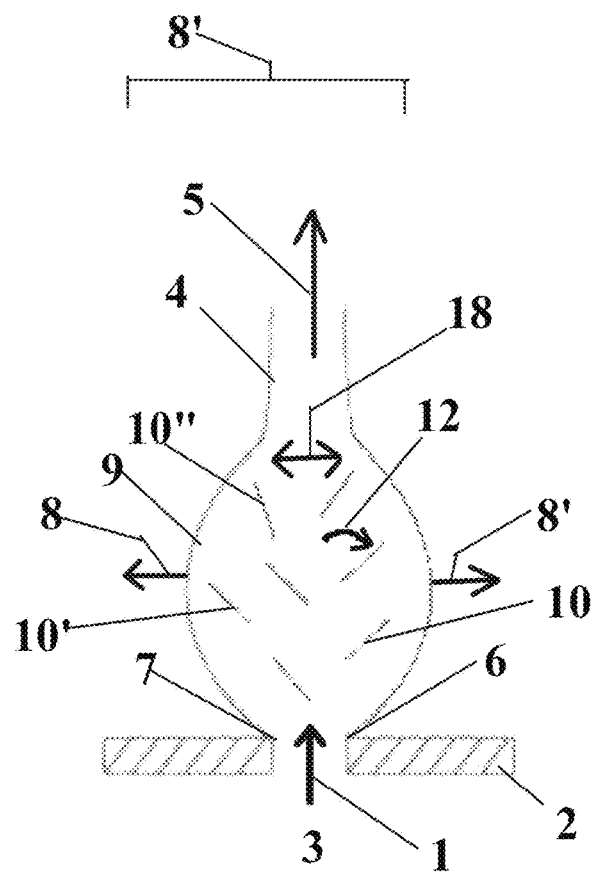
FIG. 1B is a side, partially cut-away view of the preferred method of the present invention, illustrating enhanced lateral platelet reorientation due to mechanical assist resulting from intentionally inducing enhanced die swell.

In contrast, as shown in FIG. 1B, the die swell is enhanced, resulting in increased platelet orientation in the thickness direction, due to the mechanical assist provided by the polymer chains, providing the desired matte surface finish.

The manufacturing processes to create a matte surface film utilizing polymer and filler include both the blown film process utilizing a round die and cast film process utilizing a slot or flat die for film making. Each process could utilize one or more layers where the matte materials are in one or more skin layers of the film. Interior layers of the film could contain polyethylene, nylon, EVOH, polypropylene, and/or tie layers.

The film manufacturing process in either case consists of an extruder for melting polymers and mixing ingredients and a die for forming the film shape. The die has an exit orifice called die gap which is, for example, between 45 and 120 thousandths of an inch.

The present invention is different from conventional methods of obtaining a matte film surface, as the present system exploits the use of the "die swell phenomenon, a formerly considered negative polymer attribute, to enhance the re-orientation of filler platelets in a polymer matrix in the thickness direction. This creates greater surface roughness and thus improved matte surface characteristics.

In that the die swell of polymer molecules characterized as having a melt index less than 0.99 g/10 min provides a "mechanical assist" to the platelets. This results in additional orientation in the film thickness direction. This achieves more thickness direction orientation than what would be achieved via simple polymer/filler mixing where the thickness direction orientation would be random. As discussed previously, Melt Index (MI) is a measure of the amount of polymer in grams pushed through a fixed size orifice (die) with a given weight, at a given temperature, during a given amount of time (ASTM 1238). Direction and rate of flow of the extrusion can be inferred by one having ordinary skill in the art for a given extrusion die knowing the material forming the extrusion, the extrusion equipment and die utilized, and the Melt Index.

ELEMENTS OF THE INVENTION

1 pass through
2 die
3 materials
4 film
5 flow direction
6 exit
7 die gap
8,' swell
9,' die swell, diameter
10,','" platelets
11,' mechanical assist
12 platelet reorientation
13 surface roughness
14 exit orifice (without enhanced die swell)
15 low die swell
16 minor platelet orientation
17 film (low die swell extrusion)
18,' thickness direction The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A method of forming a matte surface finish on a polymer film having a thickness, the method comprising the steps of:
   a) providing 0 to 85% by weight of one or more thermoplastic polymers having a high molecular weight characterized by a melt index ($I_2$) of less than 0.99 g/10 min;
   b) providing 15 to 75% by weight of inorganic and/or organic filler material;
   c) mixing said one or more thermoplastic polymers of step (a) with said filler material of step (b), thereby providing a polymer mix;
   d) extruding said polymer/filler mix through an extrusion die at a direction and rate of flow through said die so that said melt index of said one or more thermoplastic polymers facilitates relaxation in said one or more the thermoplastic polymers upon exiting said die, resulting in die swell upon said exit; and
   e) utilizing said die swell and a shape of said filler material to facilitate reorientation of said filler material from a flow direction of the polymer/filler mix prior to exiting said extrusion die to a thickness direction of the extruded polymer/filler mix after exiting said extrusion die, the thickness-direction oriented filler material forming a matte surface finish in an extruded film of the polymer/filler mix.

2. The method of claim 1, wherein in step (b) said filler material is platelet-shaped, and wherein in step (e) said platelet-shaped filler material becomes oriented in the thickness direction relative to said film extrusion so as to form said matte surface finish on said film extrusion.

3. The method of claim 2, wherein said one or more thermoplastic polymers of step (a) comprise a copolymer having the melt index ($I_2$) of less than 0.99 g/10 min (ASTM method D1238) and a density of 0.900 to 0.965 g/cc (ASTM method D1505), said melt index providing mechanical assistance in re-orienting said filler material in step (e).

4. The method of claim 3, wherein in step (a) said one or more thermoplastic polymers comprise a first thermoplastic polymer, and wherein there is provided the added step of providing a second thermoplastic copolymer having a melt index ($I_2$) of less than (0.99 g/10 min (ASTM method D1238) and a density of 0.900 to 0.965 g/cc (ASTM method D1505).

5. The method of claim 3, wherein in step (b) said filler material comprises a mineral.

6. The method of claim 1, wherein said one or more thermoplastic polymers of step (a) comprise a copolymer having the melt index ($I_2$) of less than 0.99 g/10 min (ASTM method D1238) and a density of 0.900 to 0.965 g/cc (ASTM method D1505), said melt index providing mechanical assistance in re-orienting said filler material in step (e).

7. The method of claim 6, wherein in step (a) said one or more thermoplastic polymers comprise a first thermoplastic polymer, and wherein there is provided the added step of providing a second thermoplastic copolymer having a melt index ($I_2$) of less than 0.99 g/10 min (ASTM method D1238) and a density of 0.900 to 0.965 g/cc (ASTM method D1505).

8. A method of providing a matte surface finish on a blown film extrusion, the method comprising the steps of:
   a) mixing a polymer with a filler, thereby providing a polymer/filler mixture; and
   b) extruding said polymer/filler mixture through a blown film extrusion die so as to facilitate in said polymer/filler mixture swelling upon exiting said die, thereby producing die swell in a blown film extrusion of the polymer/filler mixture upon said exit,
   wherein a shape of said filler and said die swell produced by swelling in said polymer/filler mixture forming said blown film extrusion upon exiting said die facilitate re-orientation of said filler from a direction of said extrusion to a z-axis direction distinct from said direction of said blown film extrusion, the z-axis direction orientation of said filler thereby forming the matte surface finish on said blown film extrusion.

9. The method of claim 8, wherein in step (a) said filler is platelet-shaped, and wherein in step (b) said platelet-shaped filler becomes oriented in the z-axis direction relative to said blown film extrusion so as to form the matte surface finish on said film extrusion.

10. The method of claim 9, wherein said polymer of step (a) comprises a thermoplastic copolymer having a melt index ($I_2$) of less than 0.99 g/10 min (ASTM method D1238) and a density of 0.900 to 0.965 g/ee (ASTM method D1505), said melt index mechanically assisting said re-orientation of said filler in step (b).

11. The method of claim 10, wherein in step (a) there is provided the added step of providing a second polymer having a melt index ($I_2$) of less than 0.99 g/10 min (ASTM method D1238) and a density of 0.900 to 0.965 g/cc (ASTM method D1505).

12. The method of claim 11, wherein in step (a) said filler comprises a mineral.

13. The method of claim 12, wherein said mineral comprises mica, calcium carbonate, talc, or a combination thereof.

14. The method of claim 8, wherein said polymer of step (a) comprises a thermoplastic copolymer having a melt index ($I_2$) of less than 0.99 g/10 min (ASTM method D1238) and a density of 0.900 to 0.965 glee (ASTM method D1505), said melt index mechanically assisting said re-orientation of said filler in step (b).

15. The method of claim 14, wherein in step (a) there is provided the added step of providing a second polymer having a melt index ($I_2$) of less than 0.99 g/10 min (ASTM method D1238) and a density of 0.900 to 0.965 g/cc (ASTM method D1505).

* * * * *